(12) United States Patent
Kasahara et al.

(10) Patent No.: US 6,426,865 B2
(45) Date of Patent: Jul. 30, 2002

(54) ELECTRIC DOUBLE LAYER CAPACITOR

(75) Inventors: Ryuichi Kasahara; Takashi Saito, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/801,171

(22) Filed: Mar. 6, 2001

(30) Foreign Application Priority Data

Mar. 7, 2000 (JP) ........................................ 2000-061720

(51) Int. Cl.[7] .................................................. H01G 9/02
(52) U.S. Cl. ...................................... 361/512; 29/25.03
(58) Field of Search ................................. 361/502, 503, 361/511, 512, 508; 29/25.03

(56) References Cited

FOREIGN PATENT DOCUMENTS

| JP | 63-226019 | | 9/1988 |
|----|-----------|---|--------|
| JP | 5-82396   |   | 4/1993 |
| JP | 6-53079 A | * | 2/1994 |
| JP | 6-196364  |   | 7/1994 |
| JP | 7-99141   |   | 4/1995 |
| JP | 11-154360 |   | 6/1999 |

* cited by examiner

Primary Examiner—Anthony Dinkins

(57) ABSTRACT

An electric double layer capacitor includes a plurality of basic cells each including a pair of polarizing electrodes sandwiching therebetween a separator and impregnated with an electrolyte. The separator is made of unwoven fabric or porous film including polyolefine or fluorine based resin. The polarizing electrodes and the separator are bonded together in advance before stacking the basic cells to form a stacked cell structure. The bonding is performed by applying a thrust pressure to the polarizing electrodes sandwiching the separator, while heating at a temperature above a softening temperature of the polyolefine or fluorine based resin.

10 Claims, 2 Drawing Sheets

ELECTRIC DOUBLE LAYER CAPACITOR

BACKGROUND OF THE INVENTION

1. Field of the Invention

The present invention relates to an electric double layer capacitor, and more specifically, relates to an electric double layer capacitor having a pair of polarizing electrodes sandwiching therebetween a separator. The present invention also relates to a method for fabrication thereof.

2. Description of the Related Art

An electric double layer capacitor (EDLC) is known as an electric charge storage device which stores electric charge in an electric double layer formed at the interface between a polarizing electrode and an electrolyte. The structure of a basic cell for the EDLC is shown in FIG. 1. The EDLC includes a stacked cell structure including at least one basic cell (single basic cell in this example) sandwiched between a pair of thrust plates 19 by using bolts and nuts 20 and 21. The basic cell includes a pair of polarizing electrodes 11, a separator 12 sandwiched therebetween, a pair of current collectors sandwiching therebetween the polarizing electrodes 11 and the separator 12.

The polarizing electrode 11 is required to be stable in the presence of the electrolyte, and have excellent electric conductivity and a large surface area. Thus, activated carbon powder or activated carbon fiber is used as the polarizing electrode 11. The polarizing electrode 11 is also obtained by molding activated carbon with a binder such as polytetrafluoroethylene, as described in Japanese Patent Laid-Open Publication Hei 6-196364, or a solid-state activated carbon in which activated carbon is bonded with polyacene and carbon, as described in Japanese Patent Laid-Open Publications Hei 7-99141 and Sho 63-226019.

The electrolyte is largely categorized into two types including an aqueous solution type and an organic solvent type. As the aqueous solution type electrolyte, sulfuric acid or potassium hydroxide is mainly used, and as the organic solvent type electrolyte, quaternary ammonium salt or the like is mainly used. As a separator 12, porous films having an electrical insulating property and high ionic permeability are used, which include, for example, nonwoven fabrics such as glass fiber or polypropylene fiber, and polyolefine porous films. As the current collector 13, rubber or elastomer imparted with electric conductivity by carbon powder or the like is used in the case of electrolyte of the aqueous solution type, whereas a metallic film is used in the case of electrolyte of the organic solvent type.

A gasket 14 has a function of maintaining the shape of the basic cell and preventing the electrolyte from leaking, as well as preventing a short-circuit failure due to contact of top and bottom collectors 13. On the outside of the collector 13, there are provided terminal boards or lead terminals 15 electrically connected to the current collectors 13. In order to reduce the internal resistance of the basic cell, thrusting pressure is applied by the insulating thrust plates 19 from outside of the upper and lower terminal boards 15, and four corners of the thrust plate 19 are secured by bolts 20 and nuts 21.

The withstand voltage of the basic cell shown in FIG. 3 is determined depending on the electrolyte. When the aqueous solution type electrolyte is used, the withstand voltage is 1.0 V. When the organic solvent type electrolyte is used, it is about 2.0 to 3.0 V depending on the electrolyte to be used. In the cell structure of the EDLC, a plurality of basic cells are stacked one on another depending on the necessary withstand voltage.

The EDLCs have been used for applications of relatively small current, such as back up of semiconductor memory devices. On the other hand, recently, development for an application requiring a large current, such as energy regeneration in vehicles, no-service interruption power source in electronic equipment or the like, has been desired. In order to obtain the large current, it is desired to reduce the thicknesses of the electrodes 11 and the current collectors 13 and to reduce the equivalent series resistance (hereinafter referred to as "ESR") of the EDLC. Moreover, since the electronic equipment have been made small, the EDLC for use in such electronic equipment is also desired to have a lower thickness.

However, with the conventional EDLC shown in FIG. 1, there is a problem in that the contact resistance between the current collector 13 and the polarizing electrode 11 is large. There is also another problem in that even if this contact resistance is reduced by applying a thrust pressure from both the sides of the cell structure for fixing, the contact resistance eventually increases with the reduction of the applied pressure, thereby increasing the ESR. Moreover, with the conventional EDLC, there is another problem in that if it is used for a long time in a condition exceeding the working temperature range and the voltage range, peeling-off occurs between the current collector 13 and the polarizing electrode 11 and between the polarizing electrode and the separator 12 due to the gas generated inside the capacitor, and as a result, the ESR increases.

In order to solve those problems as recited above, it is considered to bond the polarizing electrode and the current collector, and to bond the polarizing electrode and the separator. As a method of bonding the polarizing electrode and the current collector, there can be mentioned a method of bonding these with an adhesive strength that the current collector originally has, or a method of bonding these with a conductive adhesive, as shown in Japanese Patent Laid-Open Publications Hei 05-082396 and Hei 11-154360.

On the other hand, with regard to the method of bonding the polarizing electrode and the separator, since it is difficult to impart an adhesive strength to either of the polarizing electrode or the separator, there is no example reported to date.

SUMMARY OF THE INVENTION

It is therefore an object of the present invention to suppress a change in the ESR of the EDLC due to a change in the applied pressure from both the ends of the cell structure to realize a long-term reliability.

The present invention provides a method for fabricating an electric double layer capacitor comprising the consecutive steps of: sandwiching a separator between a pair of polarizing electrodes; bonding the separator to the pair of polarizing electrodes; forming a pair of current collectors in electric contact with respective the polarizing electrodes to obtain a basic cell; forming a cell structure including at least one the basic cell and a pair of lead terminals in electric contact with the current collectors disposed outermost sides of the cell structure.

In accordance with the method of the present invention, the EDLC fabricated by the method has an excellent ESR property and a long lifetime for operation. In particular, the bonded structure of the polarizing electrodes and the separator affords prevention of the change of the ESR and peeling-off between the polarizing electrodes and the separator. The bonding structure may be preferably obtained by a thermal fusion between the polarizing electrodes and the separator by using a specific material for the separator.

The above and other objects, features and advantages of the present invention will be more apparent from the following description, referring to the accompanying drawings.

DETAILED DESCRIPTION OF THE PREFERRED EMBODIMENTS

Preferred embodiments of the present invention will now be described in detail, with reference to the drawings.

Embodiment 1

Figure 1:
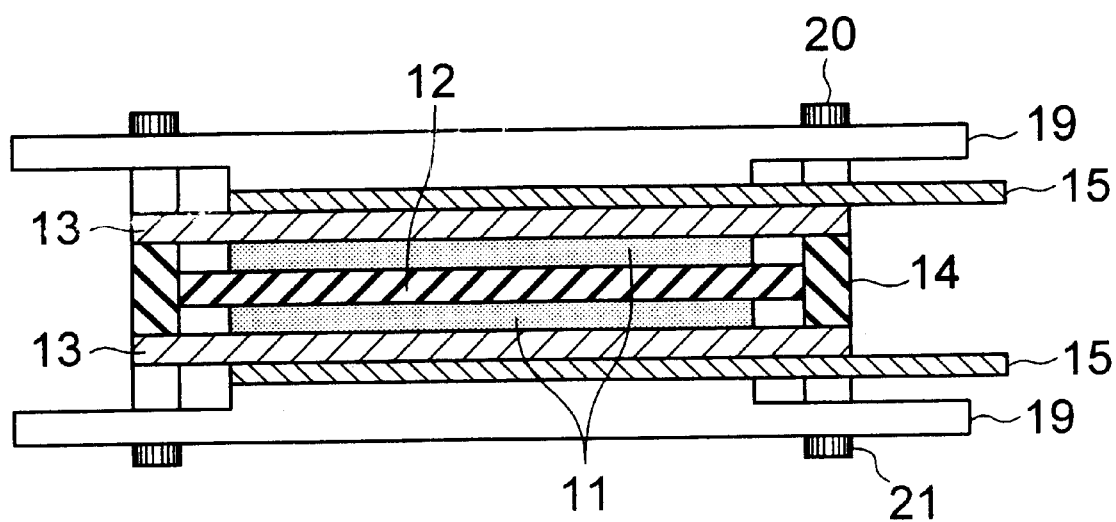
FIG. 1 is a sectional view showing a basic cell of a conventional EDLC.
Figure 2:
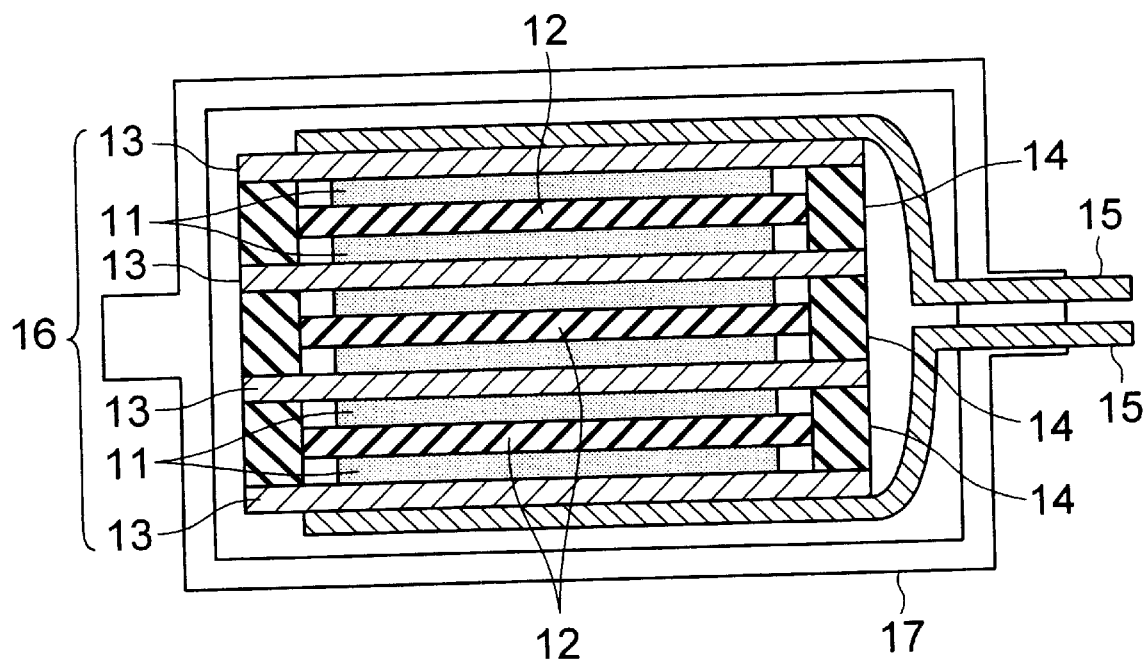
FIG. 2 is a sectional view of an EDLC showing a first embodiment of the present invention.

FIG. 2 is a sectional view of an EDLC showing a first embodiment of the present invention. In this embodiment, the EDLC has a stacked cell structure 16 including three basic cells stacked one on another. The structure of the EDLC of the present embodiment is similar to that of the conventional EDLC shown in FIG. 1, except for the number of basic cells, the bonded structure of the polarizing electrodes 11 and the separator 12, and the absence of the thrust plates in the present embodiment.

The polarizing electrodes 11 are made of a composite material made of activated carbon and polyacene, with the size of 68×48 mm, and the thickness of 0.5 mm.

The separators 12 are made of unwoven fabric made of acrylic fiber containing a polyolefine resin (for example, polypropylene fiber) by 10% in weight ratio, with the size of 70×50 mm, and the thickness of 50 $\mu$m.

The current collectors 13 are made of unvulcanized conductive butyl rubber, with the size of 80×60 mm, and the thickness of 100 $\mu$m.

The gaskets 14 are made of unvulcanized butyl rubber, and configured to have a frame shape having an outer size of 84×64 mm, an inner size of 70×50, and a thickness of 1 mm.

Next, a fabrication method of the EDLC shown in FIG. 1 will be described. Each basic cell of the EDLC has a structure such that the separator 12 is sandwiched between a pair of polarizing electrodes 11, and the polarizing electrodes 11 and the separator 2 are bonded together to form a bonded structure by a hot pressing or thermal fusion technique using a thrust pressure applied at both the polarizing electrodes 11. Here, the bonding conditions are set such that the temperature at the time of applying the thrust pressure is 120° C., and the time for applying the thrust pressure is 10 minutes.

After three basic cells each having a bonded structure wherein the separator 12 is sandwiched between the pair of polarizing electrodes 11 are prepared in similar bonding conditions, these bonded structures are introduced into a 40 wt. % aqueous solution of sulfuric acid to impregnate the polarizing electrodes 11 and the separators 12 with the aqueous solution of sulfuric acid under a reduced pressure.

Subsequently, the gasket 14 is arranged around the bonded structure and the current collector 13 are alternately laminated, to thereby sandwich the bonded structure and the gasket 14 between the pair of current collectors 13.

Then, an aluminum terminal 15 plated with tin is stacked and temporary bonded by a silver paste to each of the two current collectors 13 disposed at both the top and bottom surfaces. Then, a thrust pressure is applied from the current collectors and the gaskets from both the top and bottom by hot pressing, to thereby bond the aluminum terminals 15 and the current collectors 13 by means of the silver paste, bond the current collectors 13 and the polarizing electrodes 11, and further bond the current collectors 13 and the gaskets 14. It is to be noted that the current collectors 13 and the polarizing electrodes 11, and the current collectors 13 and the gaskets 14 are bonded by means of an adhesive strength of the current collectors.

A laminated film 17 is arranged to each of the top and bottom surfaces of the resultant device 16, so that a thermal fusion layer of the laminated film 17 and the aluminum terminal 15 are in contact with each other. The laminated film 17 is obtained by attaching a PET (polyethylene terephthalate) film having a thickness of 20 $\mu$m onto the entire top surface of one side of a thin aluminum alloy film, and attaching an ionomer film as the thermal fusion layer, having a thickness of 50 $\mu$m, onto the opposite side of the thin film. This laminated film 17 has a size such that the film extends far beyond the periphery of the device 16.

Finally, after the peripheral portions of the two laminated films 17 arranged on the top and bottom sides of the device 16 are overlapped one on another, the overlapped portions are thermally fused for bonding under a reduced pressure. In this manner, the preparation of the EDLC is completed.

In the present embodiment, three samples of EDLC were prepared by the fabrication method described above. These three samples of capacitor were prepared by different applied pressures of 50, 100 and 200 kg/cm$^2$, with the temperature at the time of applying the thrust pressure being 120° C., and the time for applying the thrust pressure being 10 minutes, as the bonding conditions at the time of preparing the bonded structure.

In addition to the samples of the EDLC of the embodiment, a comparative example #1 of EDLC was also prepared. The comparative example #1 was prepared by omitting the step of bonding the polarizing electrode 11 and the separator 12 by the hot pressing step among the steps for the samples of the embodiment described above.

Measurement of ESR and electrostatic capacitance was then conducted with respect to the samples of the embodiment and the comparative example #1.

The ESR was determined by applying an alternating voltage of 1 kHz and 10 mV in root-mean-square value to the aluminum terminal 5 of the EDLC, and measuring the strength and the phase of the current at that time. The electrostatic capacitance can be determined by applying a DC voltage of 900 mV to the aluminum terminal 15 of the EDLC for 30 minutes, discharging the stored electric charge at a rate of 1A, and calculating the capacitance from the discharge curve at the time when the discharge voltage is reduced from 60% to 50% of the charged voltage.

Subsequently, after the aluminum terminals 15 of the EDLCs in the embodiment and the comparative example #1 had been left for 240 hours under the environment of 70° C., with a voltage of 1.2 V applied thereto, the ESR and the electrostatic capacitance were measured with respect to the samples and the comparative example #1.

The results of measurement of the ESR and the electrostatic capacitance with respect to the respective EDLCs in this embodiment and the comparative example #1 are shown in Table 1.

TABLE 1

| Sample | Thrust Pressure (kg/cm²) | Immediately after fabrication | | | After 240 hrs. at 70° C., 1.2 V | | |
|---|---|---|---|---|---|---|---|
| | | ESR (mΩ) | Capacitance (F) | Appearance | ESR (mΩ) | Capacitance (F) | Appearance |
| Emb. 1 | 50 | 25 | 26 | No change | 110 | 25 | No change |
| | 100 | 24 | 28 | No change | 27 | 32 | No change |
| | 200 | 24 | 27 | No change | 28 | 32 | No change |
| Com. Ex. #1 | No bonding | 26 | 27 | No change | 1000 | Not measurable | Swelled |

Comparing the EDLC in the first embodiment and the EDLC in the comparative example #1, a significant difference in the ESR and the electrostatic capacitance cannot be recognized, immediately after the fabrication. However, after a voltage of 1.2 V had been applied for 240 hours under the environment of 70° C., the ESR of the EDLC in the comparative example #1 increased clearly. On the contrary, with the three samples of EDLC in the first embodiment, although the ESR increased in the sample in which the thrust pressure at the time of bonding of the polarizing electrode 11 and the separator 12 was 50 kg/cm², the ESR did not increase significantly in the samples in which the thrust pressure at the time of bonding was 100 and 200 kg/cm².

Thus, it is understood that the thrust pressure applied at the time of bonding the polarizing electrode 11 and the separator 12 should not be smaller than 100 kg/cm².

For a further comparison, bonding was tried between the polarizing electrode 11 and the separator 12 at a room temperature, not at 120° C., other than the comparative example #1; however, these could not be bonded.

Embodiment 2

Next, as a second embodiment, samples of EDLC were prepared in the manner similar to that in the first embodiment except that a separator 12 was composed of unwoven fabric made of glass fiber containing 10 wt. % polypropylene fiber.

Also in this embodiment, three samples of EDLC were prepared. These three samples were prepared by different applied pressures of 50, 100 and 200 kg/cm², with the temperature at the time of applying the thrust pressure being 120° C., and the time for applying the thrust pressure being 10 minutes, as the bonding conditions at the time of preparing the bonded structure of the polarizing electrodes 11 and the separator 12.

The results of measurement of the ESR and the electrostatic capacitance with respect to the samples in this embodiment are shown in Table 2, in the manner similar to that in the first embodiment.

TABLE 2

| Sample | Bonding Pressure (kg/cm²) | Immediately after fabrication | | | After 240 hrs. at 70° C., 1.2 V | | |
|---|---|---|---|---|---|---|---|
| | | ESR (mΩ) | Capacitance (F) | Appearance | ESR (mΩ) | Capacitance (F) | Appearance |
| Emb. 2 | 50 | 23 | 26 | No change | 95 | 22 | No change |
| | 100 | 23 | 28 | No change | 27 | 33 | No change |
| | 200 | 22 | 27 | No change | 26 | 31 | No change |

The ESR and the electrostatic capacitance with respect to the EDLCs in the second embodiment indicate a tendency similar to that of the first embodiment. More specifically, although the ESR increased and the electrostatic capacitance decreased in the sample in which the thrust pressure of bonding the polarizing electrode 11 and the separator 12 was 50 kg/cm², no significant change was seen in the samples in which the thrust pressures were 100 and 200 kg/cm², respectively. Thus, it is understood that, also in the case of this embodiment, the thrust pressure applied at the time of bonding the polarizing electrode 11 and the separator 12 should not be smaller than 100 kg/cm².

Embodiment 3

Next, as a third embodiment, samples of EDLC were prepared similarly to the first embodiment, except that the separator 12 was composed of unwoven fabric made of polypropylene. Also in this embodiment, three samples of EDLC were prepared. These three samples were prepared by different applied pressures of 50, 100 and 200 kg/cm², with the temperature at the time of applying the thrust pressure being 120° C., and the time for applying the thrust pressure being 10 minutes, as the bonding conditions at the time of preparing the bonded structure of polarizing electrodes 11 and separator 12. The results of measurement of the ESR and the electrostatic capacitance with respect to the EDLCs in this embodiment are shown in Table 3 similarly to the first embodiment.

TABLE 3

| Sample | Thrust Pressure (kg/cm²) | Immediately after fabrication | | | After 240 hrs. at 70° C., 1.2 V | | |
|---|---|---|---|---|---|---|---|
| | | ESR (mΩ) | Capacitance (F) | Appearance | ESR (mΩ) | Capacitance (F) | Appearance |
| Emb. 3 | 50 | 26 | 26 | No change | 180 | 12 | No change |
| | 100 | 24 | 28 | No change | 27 | 31 | No change |
| | 200 | 25 | 27 | No change | 26 | 30 | No change |

The ESR and the electrostatic capacitance with respect to the samples of EDLC in the third embodiment indicate a tendency similar to that of the first embodiment. Thus, it is seen that the thrust pressure applied at the time of bonding the polarizing electrodes 11 and the separator 12 should not be smaller than 100 kg/cm².

Embodiment 4

Next, as a fourth embodiment, polarizing electrodes 11 and separator 12 were bonded at a room temperature, using a separator 12 composed of acrylic fiber containing fluororesin (for example, polytetrafluoroethylene) by 10 wt. %. The other conditions were identical to those of the first embodiment to thereby prepare the EDLCs.

Also in this embodiment, three samples of EDLC were prepared. These three samples were prepared by different applied pressures of 50, 100 and 200 kg/cm², with the temperature at the time of applying the thrust pressure being a room temperature, and the time for applying the thrust pressure being 10 minutes, as the bonding conditions at the time of preparing the bonded structure of polarizing electrodes 11 and separator 12.

Moreover, in addition to the samples of EDLC in this embodiment, a comparative sample #2 was also prepared. The EDLC of the comparative example #2 was prepared by omitting the step of bonding the polarizing electrodes 11 and the separator 12 by room temperature pressing, among the fabrication steps in this embodiment. The results of measurement of the ESR and the electrostatic capacitance with respect to the samples in this embodiment and the comparative example #2 are shown in Table 4 similarly to the first embodiment.

Comparing the EDLC in the fourth embodiment and the EDLC in the comparative example 2, a significant difference in the ESR and the electrostatic capacitance cannot be seen, immediately after the assembly. However, after a voltage of 1.2 V had been applied for 240 hours under the environment of 70° C., the ESR of the EDLC in the comparative example 2 increased and the electrostatic capacitance decreased. On the contrary, with the EDLCs in the fourth embodiment, there can be hardly seen any change in the ESR and the electrostatic capacitance, for the samples of the thrust pressure applied during bonding the polarizing electrodes 11 and the separator 12 being not smaller than 100 kg/cm².

Thus, it is understood that an increase in the ESR can be suppressed even under an applied voltage at high temperatures, by bonding the separator 12 composed of acrylic fiber containing 10 wt. % polytetrafluoroethylene and the polarizing electrode 11 at a thrust pressure which is not smaller than 100 kg/cm² at a room temperature.

Embodiment 5

As a fifth embodiment, the polarizing electrodes 11 and the separator 12 were bonded at a room temperature, using a separator 12 composed of acrylic resin containing EPDM (ethylene-propylene dien monomer) rubber by 10 wt. %. The other conditions were similar to those of the first embodiment.

Also in this embodiment, three samples of EDLC were prepared. These three samples were prepared by different applied pressures of 50, 100 and 200 kg/cm², with the temperature at the time of applying the thrust pressure being a room temperature, and the time for applying the thrust pressure being 10 minutes, as the bonding conditions at the time of preparing the bonded structure of polarizing electrodes 11 and separator 12.

Moreover, in addition to the samples of EDLC in this embodiment, a comparative sample #3 was prepared. The EDLC of the comparative example #3 was prepared by omitting the step of bonding the polarizing electrodes 11 and the separator 12 by room temperature pressing among the fabrication steps in this embodiment. The results of mea-

TABLE 4

| Sample | Thrust Pressure (kg/cm²) | Immediately after fabrication | | | After 240 hrs. at 70° C., 1.2 V | | |
|---|---|---|---|---|---|---|---|
| | | ESR (mΩ) | Capacitance (F) | Appearance | ESR (mΩ) | Capacitance (F) | Appearance |
| Emb. 4 | 50 | 33 | 28 | No change | 85 | 25 | No change |
| | 100 | 33 | 27 | No change | 36 | 30 | No change |
| | 200 | 30 | 27 | No change | 31 | 31 | No change |
| Com. Exa. 2 | No bonding | 38 | 27 | No change | 760 | 7 | Swelled | surement of the ESR and the electrostatic capacitance with respect to the respective EDLCs in this embodiment and in the comparative example #3 are shown in Table 5 similarly to the first embodiment.

TABLE 5

| Sample | Thrust Pressure (kg/cm$^2$) | Immediately after fabrication | | | After 240 hrs. at 70° C., 1.2 V | | |
|---|---|---|---|---|---|---|---|
| | | ESR (mΩ) | Capacitance (F) | Appearance | ESR (mΩ) | Capacitance (F) | Appearance |
| Emb. 5 | 50 | 35 | 25 | No change | 140 | 25 | No change |
| | 100 | 33 | 29 | No change | 32 | 34 | No change |
| | 200 | 32 | 26 | No change | 35 | 29 | No change |
| Com. Exa. #3 | No bonding | 40 | 25 | No change | 1,200 | Not measurable | Swelled |

Comparing the three samples of EDLC in the fifth embodiment and the EDLC of the comparative example #3, there can be seen a similar tendency to that of the fourth embodiment. Thus, it is understood that an increase in the ESR can be suppressed for the samples wherein the separator 12 composed of acrylic fiber containing 10 wt. % EPDM rubber are bonded to the polarizing electrodes 11 at a thrust pressure of not lower than 100 kg/cm$^2$ at a room temperature.

Embodiment 6

Figure 3:
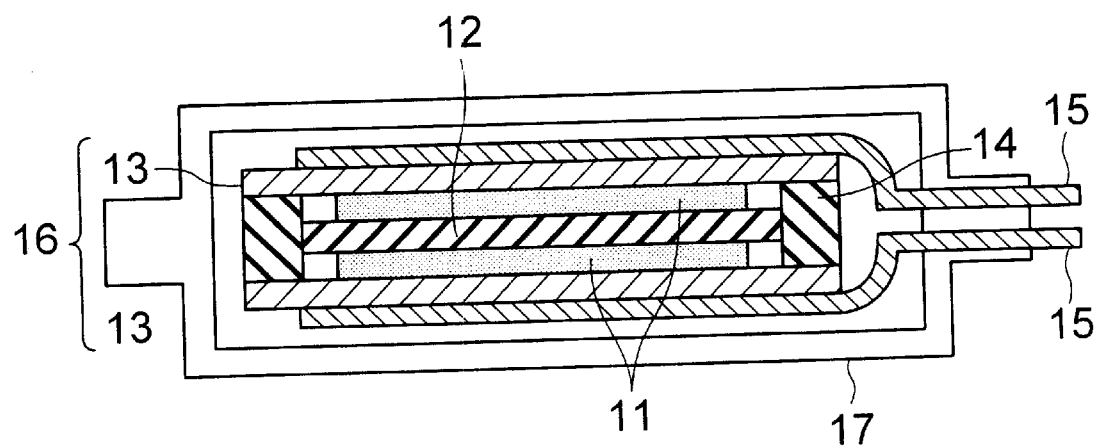
FIG. 3 is a sectional view of an EDLC showing a sixth embodiment of the present invention.

FIG. 3 is a sectional view of an EDLC according to a sixth embodiment of the present invention. In this embodiment, an EDLC of a single cell was prepared.

The polarizing electrodes 11 were produced by adding ethanol to a mixture composed of 80 wt. % coconut shell activated carbon powder, 10 wt. % polytetrafluoroethylene and 10 wt. % carbon black, and kneading the mixture, and thereafter, molding the mixture into a sheet shape and drying the sheet, and rolling the sheet to a thickness of 0.5 mm and punching the sheet in a size of 68×48 mm.

The separator 12 was composed of unwoven fabric made of acrylic resin containing 10 wt. % polypropylene fiber, with the size of 70×50 mm, and the thickness of 50 μm.

The current collector 13 was composed of an aluminum foil having a roughed surface, with the size of 80×60 mm, and the thickness of 50 μμm.

The gasket 14 was composed of unvulcanized butyl rubber, and configured to have a frame shape having an outer size of 84×64 mm, an inner size of 70×50, and a thickness of 1 mm.

Next, a fabrication method of the EDLC shown in FIG. 3 will be described. Also in this embodiment, there is used a structure in which the separator 12 is sandwiched between a pair of polarizing electrodes 11, and the polarizing electrodes 11 and the separator 12 are bonded together, by a hot pressing technique using a thrust pressure applied from the polarizing electrodes 11 on both the sides. The bonding conditions are set such that the temperature at the time of applying the thrust pressure is 120° C., the thrust pressure is 100 kg/cm$^2$, and the time for applying the thrust pressure is 10 minutes.

The bonded structure in which the separator 12 is sandwiched between the pair of polarizing electrodes 11 is introduced into propylene carbonate in which 1.0 mol/liter of tetraethylammonium tetrafluoride, an electrolyte, has been dissolved. The polarizing electrodes 11 and the separator 12 are thus impregnated with the electrolyte under a reduced pressure.

Subsequently, the gasket 14 is arranged around the bonded structure and the bonded structure and the gasket 14 are sandwiched between a pair of current collectors 13. At this time, a carbon based conductive adhesive is applied in advance on each surface of the two polarizing electrodes 11 which are to be in contact with the current collectors 13, and an epoxy based adhesive is applied in advance on the contact surfaces of the gasket 14 which is to be in contact with the current collectors 13.

Thereafter, aluminum terminals 15 plated with tin is stacked and bonded onto each of the two current collectors 13 disposed at both the top and bottom surface, by using a silver paste. Then, a thrust pressure is applied to the current collectors and the gasket from both the top and bottom surfaces by using a hot pressing technique, to thereby bond the aluminum terminals 15 and the current collectors 13 together by means of the silver paste, and bond the current collectors 13 and the polarizing electrodes 11 together, and further bond the current collectors 13 and the gasket 14 together.

A laminated film 17 is arranged to each of the top and bottom sides the device 16 obtained in this manner, so that a thermal fusion of the laminated film 17 and the aluminum terminal 15 are in contact with each other. After overlapping the peripheral portions of the two laminated films 17, the overlapped portions are thermally fused for bonding under a reduced pressure. The use of laminated film 17 and the thermal fusion step are similar to the first embodiment. The results of measurement of the ESR and the electrostatic capacitance with respect to the samples of EDLC in this embodiment are shown in Table 6 similarly to the first embodiment.

TABLE 6

| Sample | Immediately after fabrication | | | After 240 hrs. at 70° C., 1.2 V | | |
|---|---|---|---|---|---|---|
| | ESR (mΩ) | Electrostatic Capacitance (F) | Appearance | ESR (mΩ) | Electrostatic Capacitance (F) | Appearance |
| Emb. 6 | 175 | 110 | No change | 182 | 115 | No change |

The samples of the sixth embodiment were such that the polarizing electrodes were obtained by molding activated carbon powder with a polytetrafluoroethylene binder and an organic solvent was used as the electrolyte. Immediately after fabrication and after applying a voltage of 1.2 volts for 240 hours, substantially no change in the ESR and the electrostatic capacitance appeared.

From these results, it is understood that the polarizing electrodes obtained by molding activated carbon powder with a polytetrafluoroethylene binder, other than using a solid-state activated carbon, can achieve the advantage of the present invention. Moreover, it is understood that an organic solvent type electrolyte, other than the aqueous solution type electrolyte, also achieves the present invention.

The polarizing electrodes 11 of the present invention may be made of the activated carbon powder or activated carbon fiber described above, one obtained by molding these types of activated carbon with a polytetrafluoroethylene binder, or a solid-state activated carbon obtained by bonding these types of activated carbon with carbon.

Moreover, in the present invention, as a method of applying the thrust pressure to the pair of polarizing electrodes 11, any process which can apply a pressure of 100 kg/cm$^2$ or higher may be used. For example, hot pressing, isostatic pressing and the like can be exemplified. The thrust pressure should be 100 kg/cm$^2$ or higher within the critical limit of the pressure for the materials used therein.

Furthermore, in the above-described embodiments, the polyolefine resin, fluororesin or rubber contained in the separator 12 is 10% in weight ratio. However, it may be 10% or more In addition, as in the first to third embodiments, when unwoven fabric made of acrylic fiber, glass fiber or polypropylene, containing a polyolefine resin by 10% or more in weight ratio, is used as the separator 2, polyolefine resin in a fiber form may be used as the polyolefine resin to be contained. When a porous film such as polyolefine containing a polyolefine resin by 10% or more in weight ratio is used for the separator 12, polyolefine resin powder may be used for the polyolefine resin to be contained.

In addition, in the case of the fifth embodiment, examples of the rubber include ethylene-propylene copolymer, styrene-butadiene rubber and butyl rubber. Moreover, when the separator is a porous film, porous ceramic powder or fiber such as silica gel or alumina can be used.

According to the above embodiments, by bonding the polarizing electrodes and the separator together closely in advance, peeling-off between the polarizing electrodes and the separator due to the gas generated in the EDLC hardly occurs, even if the EDLC is used in a range exceeding the working temperature range and the working voltage range, and hence a rise in the ESR can be suppressed for a long term of working. Moreover, since the ESR can be suppressed without using thrust plates conventionally used, the weight and volume of the EDLC can be reduced.

In some embodiment, wherein the unwoven fabric or porous film containing a polyolefine resin by 10% or more in weight ratio is used for the separator, and wherein a pressure of 100 kg/cm$^2$ or higher is applied to the polarizing electrodes at a temperature higher than a softening point of the polyolefine resin contained in the separator, the softened polyolefine resin is bonded closely to the polarizing electrodes, and hence peeling-off between the polarizing electrodes and the separator can be prevented.

In other embodiment, wherein the unwoven fabric or porous film containing fluororesin or rubber by 10% or more in weight ratio is used for the separator, and wherein a pressure of 100 kg/cm$^2$ or higher is applied to a pair of polarizing electrodes, the separator and the polarizing electrode are closely bonded together by means of the tackiness of the fluororesin or rubber, and hence peeling-off between the polarizing electrode and the separator can be prevented.

Since the above embodiments are described only for examples, the present invention is not limited to the above embodiments and various modifications or alterations can be easily made therefrom by those skilled in the art without departing from the scope of the present invention.

What is claimed is:

1. In an electric double-layer capacitor (EDLC) comprising a cell assembly including at least one basic cell having a pair of polarizing electrodes impregnated with electrolyte, a separator sandwiched between said polarizing electrodes, a pair of current collectors sandwiching therebetween said unit cell, and a pair of lead terminals in electric contact with said current collectors, the improvement wherein said separator is bonded onto said pair of polarizing electrodes by a thermal fusion.

2. The EDLC as defined in claim 1, wherein said separator is a film made of unwoven fabric or a porous material including 10 wt. % or more polyolefine based resin.

3. The EDLC as defined in claim 1, wherein said separator is a film made of unwoven fabric or porous material including 10 wt. % or more fluorine based resin or rubber.

4. A method for fabricating an electric double layer capacitor comprising the consecutive steps of: sandwiching a separator between a pair of polarizing electrodes; bonding said separator to said pair of polarizing electrodes by a thermal fusion; forming a pair of current collectors in electric contact with respective said polarizing electrodes to obtain a basic cell; forming a cell structure including at least one said basic cell and a pair of lead terminals in electric contact with said current collectors disposed outermost sides of said cell structure.

5. The method as defined in claim 4, wherein said separator is a film made of unwoven fabric or a porous material including 10 wt. % or more polyolefine based resin.

6. The method as defined in claim 5, said bonding step includes applying a thrust pressure between each of said polarizing electrodes and said separator at a temperature which is not lower than a softening temperature of said polyolefine based resin.

7. The method as defined in claim 6, wherein said thrust pressure is not lower than 100 kg/cm$^2$.

8. The method as defined in claim 4, wherein said separator is a film made of unwoven fabric or porous material including 10 wt. % or more fluorine based resin or rubber.

9. The method as defined in claim 8, said bonding step includes applying a thrust pressure between each of said polarizing electrodes and said separator at a temperature which is not lower than a softening temperature of said fluorine based resin.

10. The method as defined in claim 9, wherein said thrust pressure is not lower than 100 kg/cm$^2$.

* * * * *